Patented July 18, 1950

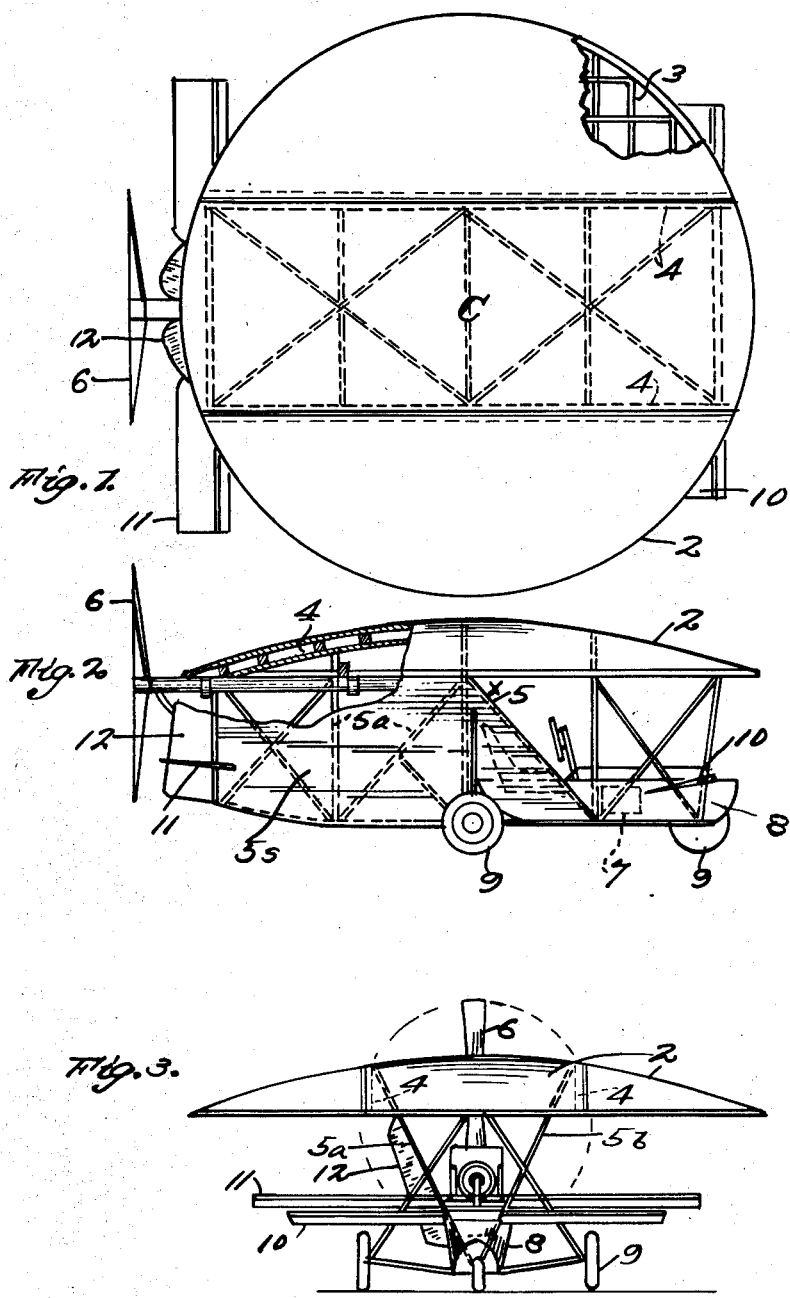

2,515,587

UNITED STATES PATENT OFFICE 2,515,587

AIRPLANE WITH CIRCULAR AIRFOIL

Joseph A. Blondin, West Los Angeles, Calif.

Application August 19, 1946, Serial No. 691,561

2 Claims. (Cl. 244—13)

This invention is an aircraft of the heavier-than-air type and is characterized by a main lifting member of open parachute form of very rigid structure and will be considered herein as a "parachute-plane."

As early as 1896 Chanute and Herring developed, as a kite, dome surface lifting members but for lack of speed the type was not promoted in the industry.

It is therefore an object of this invention to provide a parachute-plane which overcomes the various objections to the early dome-kite forms by providing means, and constructions and arrangements of the several structural features to produce a dynamic, power driven, man carrying and manually controlled aircraft; one in which the main lifting member is designed to completely encase all its structural framework.

Another object is to provide a parachute-plane in which the chassis or fuselage is characterized by a longitudinal keel and V arrangement of struts and a horizontal longeron device all in a rigid combination with the parachute-plane lifting member and carrying the driving motor and propeller, and landing, and flight controls, and ground gear.

The invention resides in certain features of advancement in this art as set forth in the ensuing disclosure and having, with the above, additional objects and advantages as hereinafter developed, and whose constructions, combinations and details of means and the manner of operation will be made manifest in the following description of the herewith illustrative embodiment; it being understood that modifications, variations and adaptations may be resorted to within the scope, spirit and principles of the invention as it is claimed in conclusion hereof.

Figure 1 is a plan, partly broken away, of the aircraft.

Figure 2 is a side elevation, and Figure 3 is a front end elevation of the craft.

The main flight or lifting member 2 is of completely circular form without cut-out or projecting features and being of hollow spherical-segment form, convexed on top and concaved, parachute-like, underneath being deeply spherically cambered. The member is of generally hollow structure enclosing a rigid lattice truss 3, suitably sheathed on top and bottom. Extending front to rear of and rigidly joined to structure of the plane is suitably reinforced framework 4 rectangular in planform to the longerons of which is connected the top gear of the equipment-carrying body structure or chassis 5.

The lifting member 2 is preferably composed of three longitudinal sections the two outermost of which can be disconnected from the longitudinal limbs of the spherical shaped framework 4, for storage or other purpose.

Securely supported by the rear end of the framework 4 is a pusher propeller 6, at the plane of the rim of the lifting member 2 and driven by any suitable gear powered by a motor 7 mounted in the forward structure of the chassis 5.

The chassis is composed of a pair of rigid, side, flat longitudinal truss frames 5a and 5b rigidly secured at the upper edges to the adjacent longerons framework 4 and converging downward and rigidly fixed edge to edge to form a keel. The rearward portions of the side frames from their top, at the rim plane of the member 2, are covered with suitable surface material 5s to form fin surfaces to provide yaw stability, for the whole craft, together with keel surface to counteract propeller torque.

The forward portion of the fuselage includes a combined motor and pilot station, or box, of narrow dimensions and upstanding side wall 8; the fuselage having a tri-wheel landing gear 9.

The chassis and its loads are so related to the lifting member 2 that its center of gravity, at X, is located forward of the geometric center of the member, at C. The craft's center of lift, in normal flight, is located directly over the center of gravity X from where it can be readily shifted and controlled by operating the fore-and-aft elevator surfaces 10 and 11; one pair at the front and one pair at the rear, and which are so coupled as to operate as ailerons, as is well known in the art.

Two vertical rudders 12 are mounted on the rear ends of the side frames 5a and 5b, and are operative as set forth in U. S. Patent No. 1,839,194, to Joseph Blondin.

An important object of the invention is to provide an especially safe type of airplane, and one that will be of great value in the original training period of prospective pilots.

The most dangerous flying period of any type of airplane is during the take-off when the craft is nosed up to gain altitude. Engine failure at this moment has accounted for the majority of recorded, fatal crashes. Another large percentage of crashes results from approaching the ground too slowly when attempting a landing. In both cases fatality is due to the fact that conventional planes are designed for aerodynamic-lift incident to forward speed only. Without relatively great forward speed their long and narrow wings are poorly adapted to retard vertical fall.

What is claimed is:

1. In a parachute-type airplane, a concavo-bottom discal wing having affixed therebelow a fuselage structure consisting of two longitudinally extending side frames which converge downwardly and have fixed, mutually contacting lower edge portions and give the fuselage a V-shape cross-section and the frames having surface panelled, rear portions; said frames forming therebetween a passageway for free flow of air along the lower face of said wing, and a propeller mounted on the rear portion of the wing and fuselage structure and at the end of said passageway.

2. The airplane of claim 1; the fuselage having mounted thereon fore-and-aft elevator surfaces.

JOSEPH A. BLONDIN.

REFERENCES CITED

The following references are of record in the file of this patent:

UNITED STATES PATENTS

| Number | Name | Date |
|---|---|---|
| 935,862 | Reinoehl | Oct. 5, 1909 |
| 966,151 | Adams | Aug. 2, 1910 |
| 983,750 | Mylius | Feb. 7, 1911 |
| 983,868 | Bellville et al. | Feb. 14, 1911 |
| 1,115,041 | Wachtel | Oct. 27, 1914 |
| 1,335,690 | Kaufman | Mar. 30, 1920 |
| 1,681,761 | Blasi | Aug. 21, 1928 |
| 1,755,828 | Von Kories | Apr. 22, 1930 |
| 1,804,588 | Bowker | May 12, 1931 |
| 1,806,148 | Dahl | May 19, 1931 |
| 1,836,896 | Brown | Dec. 15, 1931 |
| 1,848,578 | Scroggs | Mar. 8, 1932 |
| 1,864,964 | Vaile | June 28, 1932 |